INVENTOR
H. C. BOWMAN
BY Walter M. Hill
ATTORNEY

United States Patent Office 3,532,998
Patented Oct. 6, 1970

3,532,998
LINEAR SWEEP WAVE GENERATOR EMPLOYING GRID EMISSION CURRENT OF ELECTRON DISCHARGE DEVICE
Howard C. Bowman, Winston-Salem, N.C., assignor to Bell Telephone Laboratories, Incorporated, Murray Hill and Berkeley Heights, N.J., a corporation of New York
Filed Sept. 25, 1967, Ser. No. 670,058
Int. Cl. H03k 4/10, 4/86
U.S. Cl. 328—182                                    4 Claims

ABSTRACT OF THE DISCLOSURE

A linear sweep wave generator in which the anode and grid of a vacuum tube are connected in series with a direct voltage source and a capacitor. Electrons emitted from the grid charge the capacitor at a constant rate. The cathode of the vacuum tube is connected in series with a potentiometer to form a cathode follower circuit. A ramp voltage appears at the potentiometer slider as the capacitor charges.

BACKGROUND OF THE INVENTION

This invention relates to linear sweep wave or ramp voltage generators.

Ramp or linear sweep generators of the prior art generally achieve linearity by charging a capacitor through a constant current circuit U.S. Pat. 2,554,172 granted May 22, 1951 to T. G. Custin is illustrative of these circuits, the constant current circuit of which comprises a pentode and its associated circuitry. However, good linearity over extended periods of time is difficult to achieve and the prior art circuits are restricted to maximum durations of only a few seconds. By taking advantage of the grid emission characteristic of a vacuum tube, a characteristic which is generally ignored or suppressed, the present invention results in circuit of much simpler configuration than those of the prior art and also maintains a very high degree of linearity for periods which may be not only as short as a few microseconds but may be extended to several hours.

SUMMARY OF THE INVENTION

The present invention comprises an electron discharge device having at least an anode, a cathode and a grid connected in circuit with a potentiometer resistor to form a cathode follower circuit. The anode is connected to a positive source of direct voltage, the potentiometer resistor connects the cathode to a negative source of direct voltage and the grid is connected to ground through a capacitor shunted by a switch. The potentiometer may be adjusted so its slider stands at an initial output voltage (which may be zero) when the grid switch is closed. When the switch is opened, the electrons emitted from the grid at a constant rate create a constant grid current to linearly charge the capacitor. Cathode follower action causes a ramp voltage to develop at the potentiometer slider.

BRIEF DESCRIPTION OF THE DRAWINGS

The invention may be better understood by reference to the accompanying drawings in which.

DETAILED DESCRIPTION

Figure 1:
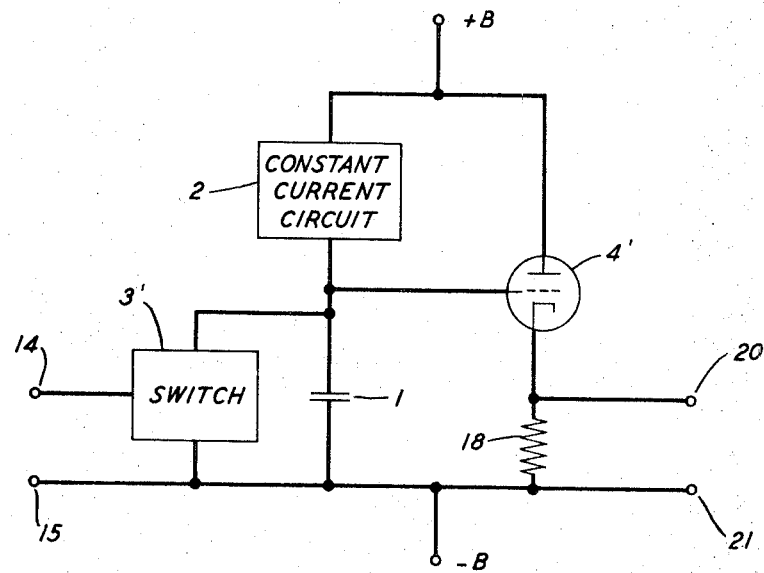
FIG. 1 discloses a circuit illustrative of prior art.

FIG. 1 discloses a linear sweep wave generator of the type disclosed in the above-mentioned Custin patent and is illustrative of much of the prior art insofar as the capacitor charging circuit is concerned. In this figure, a capacitor 1 is initially held discharged by a switch 3' which shunts it. When this switch is opened, current flowing through the constant current circuit 2 will be diverted from the switch through capacitor 1 so that its terminal voltage increases linearly with time. Vacuum tube 4' is connected as a cathode follower with its grid connected to the upper end of capacitor 1. The lower end of cathode resistor 18 is connected to the lower end of capacitor 1. As a result, the voltage appearing across output terminals 20 and 21 will be caused to follow the voltage appearing across capacitor 1 and will, therefore, also vary linearly with time. Switch 3' may be operated by voltage pulses which may be applied to terminals 14 and 15.

The constant current circuit of the prior art generally comprises a pentode circuit and the minimum current which such a circuit can hold at a constant level will charge most any practical sized capacitor within a few seconds. Consequently, linear ramps extending over long periods of time cannot be achieved by such a circuit.

The self-biasing action of the cathode resistor in cathode follower circuits back-biases the grid-to-cathode space path to prevent any appreciable flow of electrons from the cathode to the grid. However, even under these conditions, there may be emission from the grid to the more positive anode and it is this latter phenomenon that is utilized in the practice of this invention.

Figure 2:
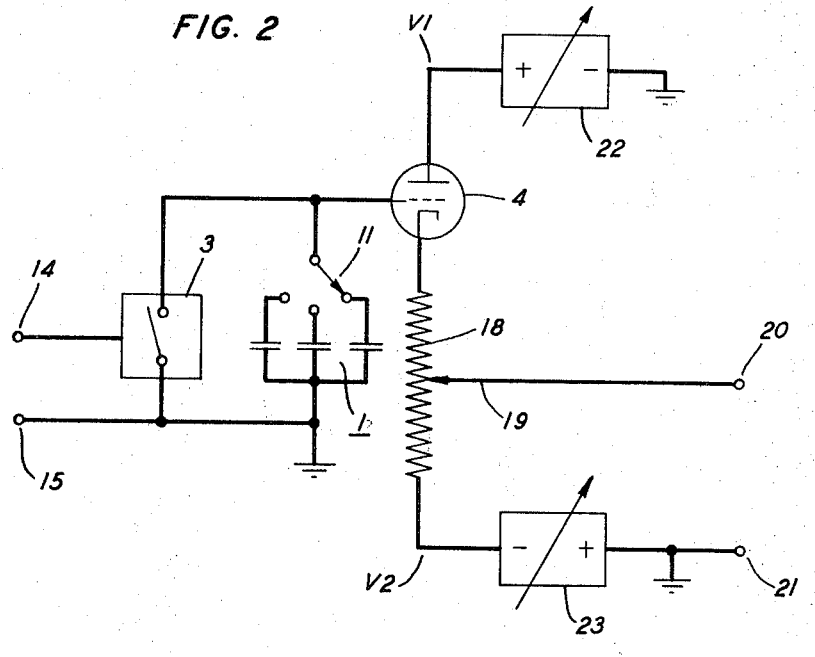
FIG. 2 discloses a preferred embodiment of the invention.

In FIG. 2 a vacuum tube 4 having an anode, a cathode and a grid is shown with its anode connected to a positive source of potential V1. This potential is obtained from the direct voltage source 22, the negative terminal of which is grounded and the positive terminal of which is connected to the anode. The cathode is connected through the resistive element 18 of a potentiometer to a negative source of potential V2, this negative potential being supplied by direct voltage source 23 having its positive terminal grounded and its negative terminal connected to the lower end of potentiometer 18. The grid of the tube is connected to ground through a capacitive means 1 which is preferably made adjustable by a conventional arrangement including a multipoint switch 11. A switch 3 is connected across the capacitive means 1 and this switch may be operated either by hand or by conventional means from electric signals applied to terminals 14 and 15 in essentially the same manner described in the Custin patent. A slider 19 of the potentiometer 18 is connected to an output terminal 20, the output being obtained between terminal 20 and the grounded terminal 21.

So long as switch 3 is closed, the grid of tube 4 is held at ground potential and there is no charge in the capacitive means 1. During this time, electrons emitted from the grid are flowing to the anode through a path beginning from the grounded side of switch 3, through the switch, the space path between the grid and anode and back to ground through direct voltage source 22. When switch 3 is opened, this current will flow through the capacitive means 1, thereby producing a charge therein which causes the grid to become more positive with reference to ground. It has been found that most vacuum tubes operating under the conditions specified will emit a limited number of electrons under a saturated condition so that the current between the grid and anode remains highly constant. As a result, the charge in capacitive means 1 will accumulate linearly with time thereby causing the grid potential to become more positive linearly with time. By reason of the cathode follower action of the circuit, the potential of output terminal 20 will also vary linearly with time. The cathode follower circuit effectively isolates the output terminals 20, 21 from the capacitive means 1.

If it is desired that the ramp voltage begin at zero volts, slider 19 of the potentiometer is adjusted so zero volts appear between output terminal 20 and grounded terminal 21 when switch 3 is closed. Instead of causing the ramp voltage to start from zero volts, it may be caused to start from any desired negative or positive voltage by simply adjusting slider 19 to that voltage while switch 3 is closed.

It has been stated that the electron flow between the grid and anode of tube 4 is highly constant. However, it has been found that this may be varied by varying potential V1 supplied by source 22. Variation may also be achieved to some extent by varying potential V2 of source 23. Therefore, an adjustment of either source 22 or 23 or both may be used as a means of changing the slope of the ramp voltage by changing the strength of the constant current used for charging capacitive means 1. Because of this sensitivity to voltage, sources 22 and 23 are preferably regulated. Another method of changing the slope of the ramp voltage is to change the size of capacitive means 1, the slope being lowered as the capacitance is increased. This method is generally preferred and a convenient way of accomplishing it is illustrated schematically in FIG. 2 by the plurality of capacitors each having one terminal grounded and the other terminal connected to points on the selector switch 11.

A specific practical embodiment of the invention will illustrate its capability. Sources 22 and 23 may each be made 150 volts while potentiometer 18 may have a resistance of about 4300 ohms and tube 4 may comprise one section of a 5814 vacuum tube (similar to 12AU7). If capacitor 1 is now given a capacitance of two microfarads, the output voltage at terminal 20 can be caused to increase at the rate of about one-half millivolt per second which corresponds to a charging current through the capacitor of about $10^{-9}$ amperes.

It is not essential that any particular vacuum tube be used as many commercially made vacuum tubes will exhibit this grid emission property. Moreover, the tube may be modified slightly in manufacture by deliberately giving the grid some additional electron emissive coating, thereby increasing as well as controlling the amount of electron emission from the grid.

Various modifications of this circuit embodying the essential principles of the invention will be apparent to those skilled in this art and these should be considered to fall within the scope of this invention.

What is claimed is:

1. A linear sweep wave generator comprising an electron discharge device having an anode, a cathode and a control grid, said grid being capable of electron emission, a source of direct voltage positive with respect to ground, means connecting said source to said anode, a potentiometer having a resistance element and a slider, a source of direct voltage negative with respect to ground, means connecting said resistance element in a series circuit between said cathode and said negative source of direct voltage, a switching means connected between said grid and ground, a capacitive means connected in circuit relationship between said grid and ground so that the opening of said switching means allows said capacitive means to be charged solely by said grid electron emission current, and an output terminal connected to said slider.

2. A linear sweep wave generator comprising an electron discharge device having an anode, a cathode and a control grid, said grid being capable of electron emission, a source of positive direct voltage connected to said anode, a potentiometer having its resistance element connected between said cathode and a negative source of direct voltage and its slider connected to an output terminal, a switching means connected between said grid and ground, and a capacitor connected between said grid and ground so that the opening of said switching means allows only said grid electron emission current to charge said capacitor.

3. A linear sweep wave generator characterized by an electron discharge device having a control grid capable of electron emission, an anode in said device, and a capacitive means connected in a series circuit with said grid and anode and a source of direct voltage whereby said capacitive means may be charged at a constant rate solely by said emission current.

4. The combination of claim 3 and an output terminal connected through an isolating coupling means to said capacitive means.

References Cited

UNITED STATES PATENTS

| 2,743,357 | 4/1956 | Casey | 328—184 X |
| 2,835,809 | 5/1958 | Taylor | 328—184 X |

JOHN S. HEYMAN, Primary Examiner

S. D. MILLER, Assistant Examiner

U.S. Cl. X.R.

328—184